United States Patent [19]

Pointer

[11] Patent Number: 4,657,385
[45] Date of Patent: Apr. 14, 1987

[54] PYROMETER APPARATUS

[75] Inventor: John Pointer, Tadley, England

[73] Assignee: Smiths Industries Public Limited Company, London, England

[21] Appl. No.: 725,685

[22] Filed: Apr. 22, 1985

[30] Foreign Application Priority Data

May 12, 1984 [GB] United Kingdom ............... 8412218

[51] Int. Cl.$^4$ ............................................... G01J 5/48
[52] U.S. Cl. ...................................... 356/43; 356/44; 374/130
[58] Field of Search ................................ 356/43–45; 374/130–131

[56] References Cited

U.S. PATENT DOCUMENTS 4,568,183 2/1986 Douglas ........................... 356/44 X Primary Examiner—Eugene R. LaRoche
Assistant Examiner—David Mis
Attorney, Agent, or Firm—Pollock, Vande Sande & Priddy

[57] ABSTRACT

A pyrometer for viewing the blades of an engine has a forward lens which produces a first image of the blades in an image plane $P_1$. Rearwardly of the image plane $P_1$ is an assymetric faceted lens assembly having a central region with a long focal length, and an outer annular region of shorter focal length. The outer region of the rear lens assembly forms a second image of the first image in a second image plane $P_2$. The inner region forms a third image of the forward surface of the first lens in the second image plane $P_2$. A disc mask is fixed centrally to the forward surface of the first lens, and an annular mask is located in the first image plane $P_1$. The forward end of a fibre-optic cable is located in the second image plane $P_2$ and comprises a central bundle of fibres which receives the second image, and two outer bundles which receive different parts of the third image. By monitoring the radiation from the forward surface of the first lens, the amount of contamination on the surface can be monitored.

14 Claims, 6 Drawing Figures

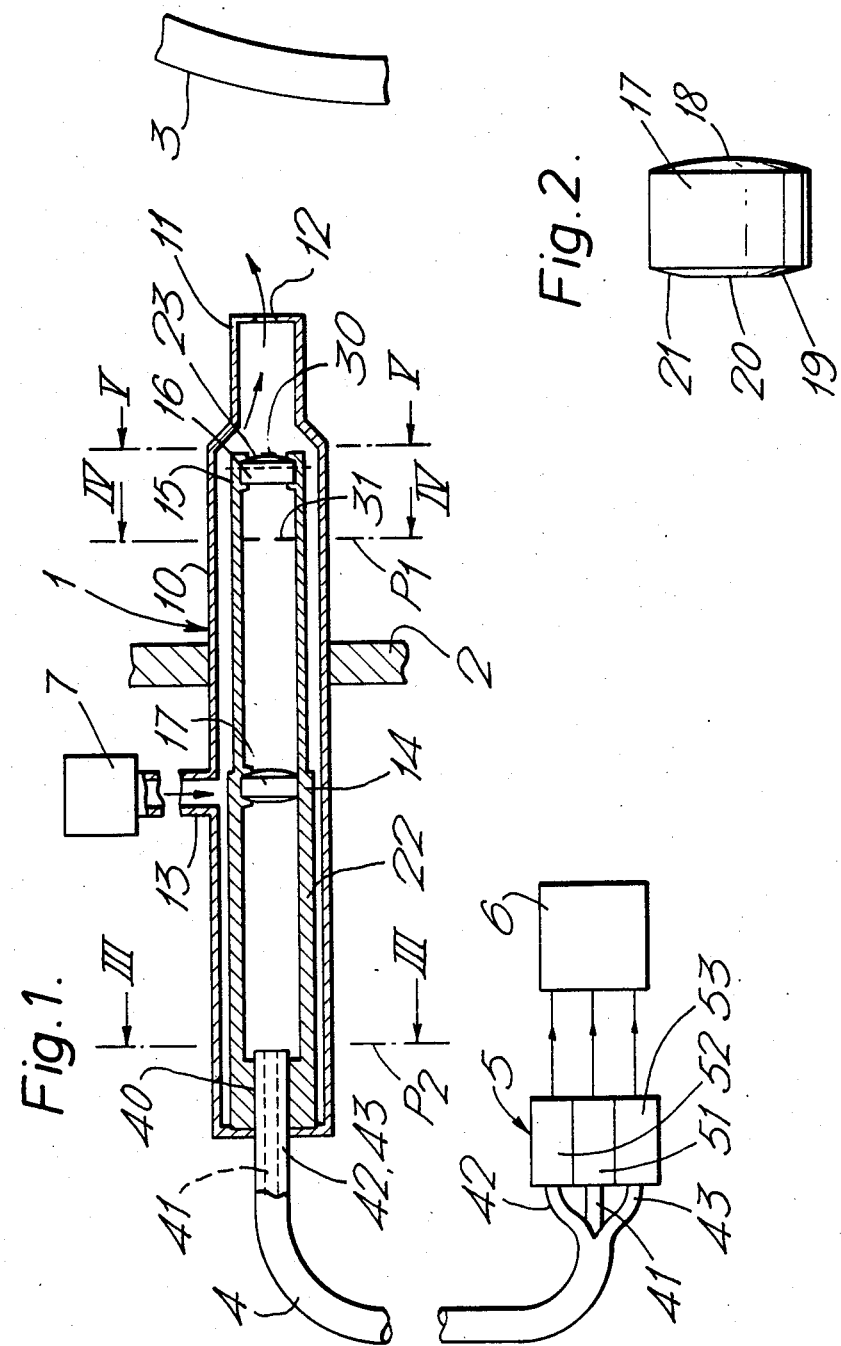

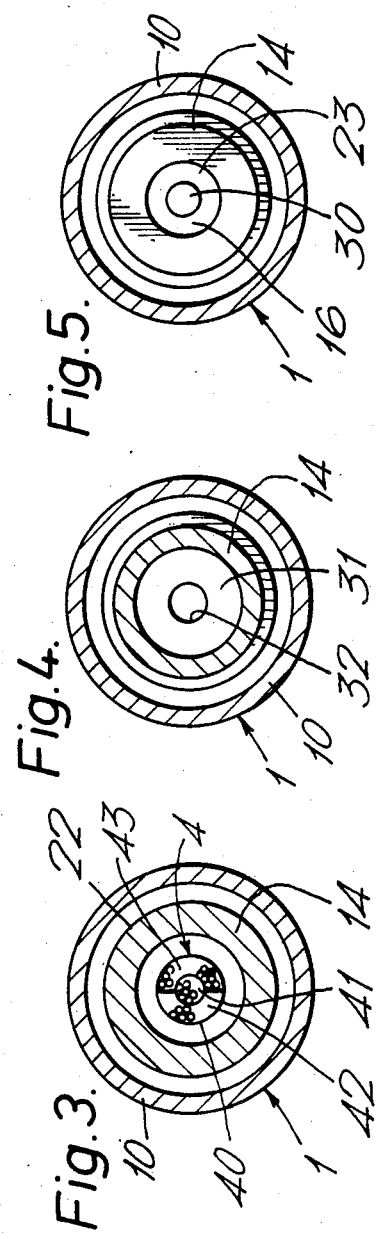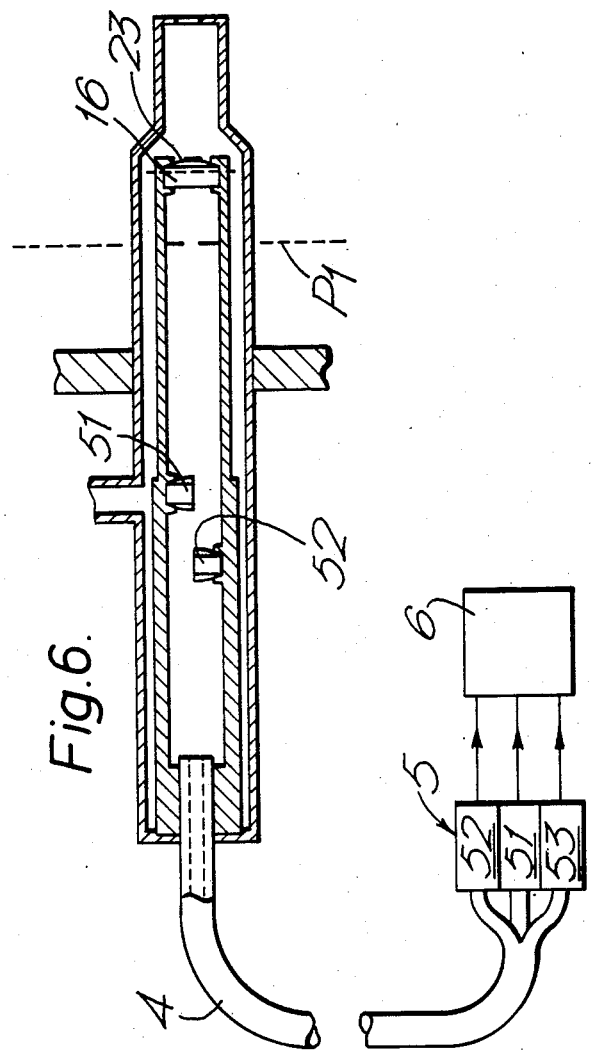

PYROMETER APPARATUS

BACKGROUND OF THE INVENTION

This invention relates to pyrometer apparatus.

Pyrometers generally comprise a heat-resistant lens that focuses radiation emitted by the object under observation onto a radiation detector. In some apparatus the radiation detector is mounted remotely, radiation being focused by the lens onto one end of a fibre-optic cable that is used to transmit radiation to the detector. One problem with such pyrometers, in certain environments, is that the forward surface of the lens can become coated with contaminants, such as combustion products, thereby altering the amount of radiation passed to the detector. Various attempts have been made to reduce contamination of the lens and to compensate for any contamination that does occur.

One proposal is to provide compensation by viewing the front surface of the lens so as to monitor the amount of contamination. So that this can be done while maintaining observation of the object, an image of the object is focused using a pin-hole aperture. It will be appreciated that the nature of a pin-hole aperture is such that the image is focused in all planes behind the aperture and, more particularly, on the front surface of the lens. In this way, radiation from the object can be monitored at the same time as the front surface of the lens. The problem with such an arrangement, however, is that the pin-hole aperture reduces the amount of radiation passed to the detector. If the size of the aperture is increased so as to pass more radiation, the resolution of the apparatus is correspondingly reduced.

BRIEF SUMMARY OF THE INVENTION

It is an object of the present invention to provide pyrometer apparatus that can be used to overcome the above-mentioned problem.

According to one aspect of the present invention, there is provided pyrometer apparatus comprising first lens means that is arranged to form a first image of an object being viewed; second lens means located rearwardly of said first lens means, said second lens means having a focal length and being located such as to form a second image, of said first image, in an image plane; third lens means located rearwardly of said first lens means, said third lens means having a focal length and being located such as to form a third image, of the forward surface of said first lens means, in said image plane; and means located substantially in said image plane for receiving radiation from said second and third lens means.

The second and third lens means may be formed as a single unit at the same distance from the first lens means and may, for example, be provided by a single assymetric faceted lens assembly with a central region of one focal length and an outer annular region of shorter focal length. Alternatively, the second and third lens means are provided by respective diametrically split lenses which may have different focal lengths.

The apparatus preferably includes masking means arranged so that the second and third images are formed at different locations on the image plane. The apparatus may include a first mask located adjacent the forward surface of the first lens, and a second mask located in the plane in which the first image is formed. The first mask is preferably a circular disc located centrally of the first lens means, and the second mask is preferably of annular shape formed with a circular aperture.

The apparatus may include means defining an aperture located forwardly of said first lens means such as to form an image of the object being viewed that is substantially integrated over the forward surface of the first lens means. The means defining the aperture is preferably the forward end of an outer tube, the first lens means being located at the forward end of an inner tube that extends coaxially within said outer tube, and said outer tube having a purge gas inlet to the rear of the forward end of the inner tube, such that purge gas flows out of the outer tube through said aperture.

The first lens means may include a converging lens and a transparent window located forwardly of the converging lens, the third lens means being arranged to form a third image of the forward surface of the transparent window. The means for receiving radiation from said second and third lens means may be the forward end of a fibre-optic cable. The fibre-optic cable may have an inner bundle of cables and an outer bundle of cables, the second image being formed on one of the bundles and the third image being formed on the other of the bundles. Preferably, the fibre-optic cable includes two outer bundles of cables which are arranged to receive an image from different parts of the forward surface of said first lens means.

Pyrometer apparatus in accordance with the present invention, and for use in a gas-turbine engine, will now be described, by way of example, with reference to the accompanying drawings.

BRIEF DESCRIPTION OF THE DRAWINGS

FIG. 1 shows the apparatus in an engine, with the pyrometer sensor head being shown in cross-sectional elevation;

FIG. 2 is an enlarged sectional view of a lens assembly of the sensor head;

FIG. 3 is a cross-section on a diameter of the sensor head along the line III—III of FIG. 1;

FIG. 4 is a cross-section on a diameter of the sensor head along the line IV—IV;

FIG. 5 is a cross-section on a diameter of the sensor head along the line V—V; and FIG. 6 is a sectional view along the length of an alternative pyrometer sensor head.

DETAILED DESCRIPTION

With reference to FIG. 1, the apparatus comprises a sensor head 1 that is mounted in a wall 2 of a gas-turbine engine, so as to view the blades 3 of the engine. The sensor head 1 is coupled, via a fibre-optic cable 4, to a radiation detector unit 5 which supplies electrical signals to a processing unit or display 6.

The sensor head 1 has an outer tubular shell 10 of a heat-resistant alloy which is open at its forward end 11 via a circular aperture 12. Purging gas is supplied to the shell 10 from a supply 7 via an inlet opening 13, the gas flowing out of the shell 11 through the aperture 12 so as to reduce the amount of combustion products and other contaminants entering the sensor head 1. The aperture also serves to allow radiation emitted by the turbine blades 3 to enter the sensor head 1, forming a blurred image in any plane behind the aperture.

Extending coaxially within the shell 10 there is a heat-resistant alloy lens tube 14 that is closed at its forward end 15 by a converging lens 16 of a sapphire or similar heat-resistant optical material, the forward end of the lens tube being located forwardly of the purge gas inlet 13. The focal length of the lens 16 is such that an image of the blades 3 is formed at a first image plane $P_1$ to the rear of the lens. Also mounted within the lens tube 14 is an assymetrically faceted lens assembly 17 to the rear of the forward lens 16 and its image plane $P_1$. As shown in greater detail in FIG. 2, the lens assembly 17 is a single unit having a front curved surface 18 and a rear surface 19 that comprises a central flat transverse region 20 surrounded by a curved outer annular region 21. In effect, the lens assembly 17 acts as two lenses according to the path of a light ray through it. Light passing through the flat central region 20 will only be subjected to the converging effect of the front surface 18, while light passing through the outer annular region 21 will experience an additional converging effect as a result of the curvature of the outer region. The focal length at the centre of the lens 17 is therefore greater than that at the outer edge of the lens.

With reference now also to FIG. 3, at the rear end 22 of the lens tube 14, there is located the forward end 40 of the fibre-optic cable 4. The forward end 40 lies in a second image plane $P_2$ of the rear lens assembly 17. The cable 4 has three fibre bundles 41, 42 and 43. One bundle 41 is of circular section and extends centrally of the cable while the other bundles 42 and 43 surround the central bundle, in two halves, together presenting an annular cross-section at the forward end 40 of the cable.

The focal length of the central part of the rear lens assembly 17 and its location are such that it focuses an image of the forward surface 23 of the forward lens 16 (and the blurred blade image formed thereon by the aperture 12) on the forward end 40 of the cable 4, in the second image plane $P_2$.

The focal length of the outer region of the rear lens assembly 17 is such that it focuses an image of the image of the blade 3 (produced by the forward lens 16, in the first image plane $P_1$) on the forward end 40 of the cable 4, in the second image plane $P_2$.

In the preferred embodiment, a small circular disc mask 30, as shown in FIG. 5, is secured to the front surface 23 of the lens 16. The size of the mask 30 is selected such that its image, formed by the central region of the rear lens assembly 17, is approximately the same diameter as the central fibre bundle 41. In this way, the image of the transparent part of the forward lens 16 is focussed solely on the outer fibre bundles 42 and 43. A second mask 31, as shown in FIG. 4, may be mounted in the first image plane $P_1$. The mask 31 is of annular form, as shown in FIG. 4, having a central aperture 32 the diameter of which is such that, when imaged on the second image plane $P_2$, the aperture has substantially the same size as the central bundle 41. Use of these two masks 31 and 32 ensures that radiation from the sharp image of the blade 3 (formed by the lens 16) is supplied to the central bundle 41, while radiation from the image of the front surface 23 of the lens 16, and the blurred image of the blade 3 (formed by the aperture 12) is supplied to the outer bundles 42 and 43, each bundle 42 and 43 viewing half the lens surface 23.

At the rear end of the cable 4, the outer bundles 42 and 43 are separated from the inner bundle 41, and the three bundles coupled to respective detectors 51, 52 and 53 within the unit 5.

In operation, the temperature of the turbine blades 3 can be monitored with a coarse or fine resolution. When a fine resolution is required, typically less than the width of one blade, the radiation transmitted along the inner bundle 41 of the cable 4 is monitored using the detector 51. Various well known techniques may be used to determine the temperature, such as involving the comparison of radiation amplitudes at two different wavelengths. When a coarse resolution is required, typically the width of two or more blades, the radiation transmitted along the outer bundles 42 and 43 of the cable is monitored using the detectors 52 and 53. The size of the aperture 12, which forms the blade image on the front surface 23 of the lens 16, is sufficiently large to ensure that the image is relatively blurred, in effect, substantially integrating the radiation from several blades. The integrated nature of the image on the front surface 23 of the lens 16 means that radiation from any point in the image plane formed by the front surface should be of equal intensity, and hence that the radiation transmitted along the outer fibre bundles 42 and 43 should be the same. However, any fouling of the front lens surface, which will generally not be equally distributed over the surface, will cause the relative intensities of radiation passed to the detectors 52 and 53 to differ. By comparing the output of the detectors 52 and 53, therefore, the extent of fouling of the front lens surface can be monitored.

It will be appreciated that many modifications can be made to the arrangement described above without departing from the invention. The rear assembly 17, in particular, could take several different forms. As mentioned above, the rear lens assembly 17 is, in effect, two lenses combined together. It would be possible, in an alternative arrangement to use, for example, two separate lenses which could have the same or differing focal lengths and be mounted at different locations. One such arrangement is shown in FIG. 6 which illustrates a lens assembly having two lenses 51 and 52 diametrically split from circular double convex lenses having different focal lengths. The focal lengths and locations of the two lenses 51 and 52 are selected such that the forward one 51 of the two lenses focuses an image of the blade image formed on the front surface 23 of the lens 16 onto the end of the cable 4, while the rear one 52 of the two lenses focuses an image of the blade image formed in plane $P_1$ onto the cable. Using two separate lenses in this way gives additional freedom in design, since the position of both lenses can be selected appropriately. The focal length of the two lenses could be the same but, by using lenses of different powers it is possible to ensure that the magnifications of the two images formed on the cable are the same.

The forward lens 16 could include a transparent window, without any image forming properties, the rear lens being located such as to form an image of the forward surface of the window in the second image plane $P_2$, so that fouling of the window can be monitored. The provision of a fibre-optic cable is not essential since the detectors could be mounted in the sensor head itself and electrical signals supplied via an electrical cable to the processing unit 6.

What I claim is:

1. Pyrometer apparatus arranged to view an object located forwardly of said pyrometer apparatus, said apparatus comprising first lens means that forms a first image of the object; second lens means that forms a second image of said first image, in an image plane; third lens means located rearwardly of said first lens means, said third lens means having a focal length and being located such that it forms a third image of the forward surface of said first lens means, in said image plane; and radiation receiving means located substantially in said image plane to receive radiation from said second and third lens means.

2. Pyrometer apparatus according to claim 1, wherein the said second and third lens means are formed as a single unit that is located at the same distance from the first lens means.

3. Pyrometer apparatus according to claim 2, wherein the said second and third lens means are provided by a single asymetric faceted lens assembly.

4. Pyrometer apparatus according to claim 3, wherein the asymetric faceted lens assembly has a central region of one focal length and an outer annular region of shorter focal length.

5. Pyrometer apparatus according to claim 1, wherein the said second and third lens means are provided by respective diametrically split lenses.

6. Pyrometer apparatus according to claim 5, wherein the said diametrically split lenses have different focal lengths.

7. Pyrometer apparatus according to claim 1, including masking means located so that the second and third images are formed at different locations on the image plane.

8. Pyrometer apparatus according to claim 7, wherein the masking means comprises a first mask in the form of a circular disc located centrally adjacent the forward surface of the first lens means, and a second mask of annular shape formed with a circular aperture and located in a plane in which the first image is formed.

9. Pyrometer apparatus according to claim 1, including means defining an aperture located forwardly of said first lens means, said aperture forming an image of the object being viewed that is substantially integrated over the forward surface of the first lens means.

10. Pyrometer apparatus according to claim 9, including an outer tube and an inner tube that extends coaxially within said outer tube, wherein the said means defining the aperture is provided by the forward end of the outer tube, wherein the said first lens means is located at the forward end of said inner tube, wherein said outer tube has an inlet connected to a supply of purge gas, said inlet being located to the rear of the forward end of the inner tube, such that purge gas flows out of the outer tube through said aperture.

11. Pyrometer apparatus according to claim 1, wherein the said first lens means includes a converging lens and a transparent window located forwardly of said converging lens, and wherein the said third lens means is located to form a third image of the forward surface of the transparent window.

12. Pyrometer apparatus according to claim 1, wherein the said radiation receiving means is an end of a fibre-optic cable, wherein the said fibre-optic cable has an inner bundle of cables and an outer bundle of cables, wherein the said second lens means forms the said second image on one of the said bundles, and wherein the said third lens means forms the said third image on the other of the said bundles.

13. Pyrometer apparatus according to claim 12, wherein the said fibre-optic cable includes two outer bundles of cables, and wherein the said two outer bundles are located to receive an image from different parts of the forward surface of the first lens means.

14. Pyrometer apparatus arranged to view an object located forwardly of said pyrometer apparatus, said apparatus comprising: an outer tube having a forward end with an aperture therein; first lens means located rearwardly of the aperture so that the aperture forms an image of the object being viewed substantially integrated over forward surface of the first lens means, said first lens means forming a first image of the object in a first image plane; second lens means that forms a second image of said first image, in a second image plane; third lens means located rearwardly of said first lens means, said third lens means having a focal length and being located such that it forms a third image of the forward surface of said first lens means, in said second image plane; a first mask located adjacent the forward surface of the first lens means; a second mask located in the said first image plane, the first and second masks being shaped so that the second and third images are formed at different locations on the second image plane; and fibre-optic cable means located in said second image plane to receive said second and third images.

* * * * *